S. M. KELSEY.
HAME AND TRACE CONNECTOR.
APPLICATION FILED MAY 2, 1914.

1,118,356.

Patented Nov. 24, 1914.

WITNESSES
R. A. Balderson
J. B. Blining

INVENTOR
Samuel M. Kelsey

UNITED STATES PATENT OFFICE.

SAMUEL M. KELSEY, OF CLEVELAND, OHIO.

HAME AND TRACE CONNECTOR.

1,118,356.      Specification of Letters Patent.      Patented Nov. 24, 1914.

Application filed May 2, 1914. Serial No. 835,873.

*To all whom it may concern:*

Be it known that I, SAMUEL M. KELSEY, a citizen of the United States, and a resident of Cleveland, Cuyahoga county, Ohio, have invented a certain new and useful Improvement in Hame and Trace Connectors, of which the following is a full, clear, and exact description, reference being had to the accompanying drawings, forming part of this specification, in which—

Figure 1:
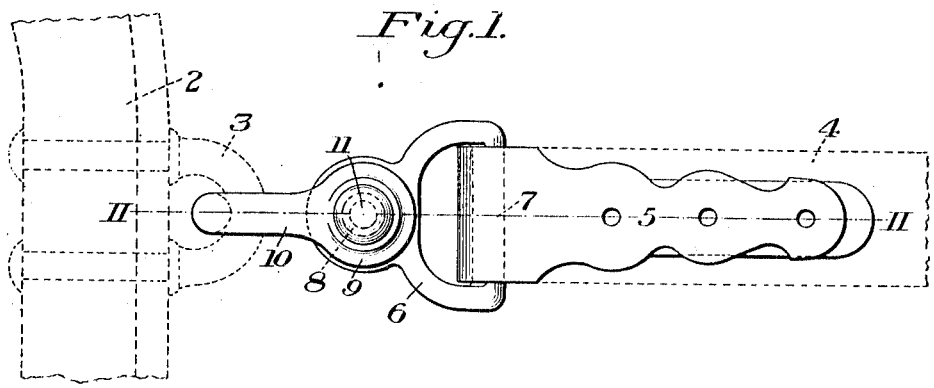
Figure 2:
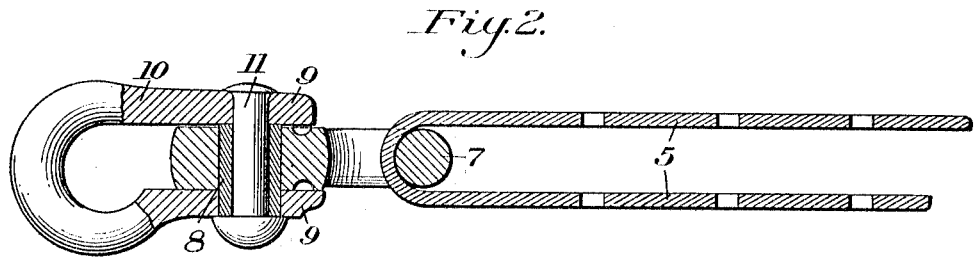
Figure 3:
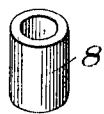

Figure 1 is a side elevation of a hame and trace connector embodying my invention, a portion of the hame being shown in dotted lines; Fig. 2 is a longitudinal section on the line II—II of Fig. 1; and Fig. 3 is a detail perspective view of the bushing.

My invention has relation to hame and trace connectors especially adapted for use in connection with the type of hames commonly known as "staple" hames, as distinguished from "bolt" hames.

The object of my invention is to provide a hame and trace connector of simple and inexpensive construction adapted for use with staple hames, and which gives a universal joint connection between the trace and the hame.

Universal connections have been largely used in connection with the bolt type of hames, but so far as I am aware a successful connection of this character has not heretofore been provided for use with staple hames, notwithstanding considerable demand exists in the trade for a device of this character.

Referring to the accompanying drawings, in which I have illustrated the preferred form of my invention, the numeral 2 designates a portion of a staple hame, having therein the usual staple 3.

4 indicates (in dotted lines) a portion of a trace to the end of which is secured the metal strap 5.

6 designates a D-loop, the cross bar 7 of which is pivotally engaged by the closed loop-forming end of the strap 5. The other end of the D is of eye-form, whose central opening is adapted to receive a bushing 8. The eye of the D is received loosely between substantially parallel jaws 9 of the loop 10, which has a loose pivotal engagement with the staple 3. A pivot, shown as consisting of a rivet 11, extends through the bushing 8 and through the jaws 9. The bushing extends from the head of the rivet through one of the jaws 9, and terminates inside the other jaw 9. By this arrangement, when the end of the rivet is upset, this upsetting does not tend to bind the eye of the D between the jaws 9 but simply binds the rivet within the bushing; and the pivotal bearing between the parts is transferred from the surface of the rivet to the surface of the bushing. This bushing may be made of steel or other wear-resisting material, while the rivet may be made of brass or other softer metal.

It will be seen that the trace has a free movement on the cross bar 7; that the D and trace can turn freely on the bushing 8 in a plane at right angles to the plane of movement of the trace on the D; and that the entire trace connection has a pivotal engagement with the hame staple. This enables the hame and trace to be easily handled when removed from the animal and the trace can be thrown back or disposed of in any desirable way owing to the perfect freedom of its connection with the hame.

I do not desire to limit myself to the exact construction and arrangement of parts which I have herein shown and described, as this may be changed in various ways within the spirit and scope of the appended claim.

I claim:

In a hame and trace connector, the combination with a loop for engagement with the staple of a staple hame and having substantially parallel jaws, of a D-member having an eye portion extending loosely between said jaws, a bushing extending loosely through one of said jaws and through the eye portion of said D-member and terminating inside of the other jaw, and a rivet passing through the bushing and jaws and securing the parts; substantially as described.

In testimony whereof, I have hereunto set my hand.

SAMUEL M. KELSEY.

Witnesses:
R. KIRK ASKER,
W. H. FRAZELL, Jr.

Copies of this patent may be obtained for five cents each, by addressing the "Commissioner of Patents, Washington, D. C."